(12) United States Patent
Hu

(10) Patent No.: US 7,484,068 B2
(45) Date of Patent: Jan. 27, 2009

(54) STORAGE SPACE MANAGEMENT METHODS AND SYSTEMS

(75) Inventor: Chih-Lin Hu, Tainan (TW)

(73) Assignee: Qisda Corporation, Taoyuan County (TW)

( * ) Notice: Subject to any disclaimer, the term of this patent is extended or adjusted under 35 U.S.C. 154(b) by 197 days.

(21) Appl. No.: 11/489,151

(22) Filed: Jul. 18, 2006

(65) Prior Publication Data
US 2007/0022269 A1    Jan. 25, 2007

(30) Foreign Application Priority Data
Jul. 19, 2005   (TW) .............................. 94124285 A (51) Int. Cl.
*G06F 12/00* (2006.01)
(52) U.S. Cl. ..................................... 711/170
(58) Field of Classification Search .................. None
See application file for complete search history.

(56) References Cited

U.S. PATENT DOCUMENTS

| | | | |
|---|---|---|---|
| 5,819,290 A | 10/1998 | Fujita | |
| 6,038,636 A * | 3/2000 | Brown et al. | 711/103 |
| 6,047,360 A * | 4/2000 | Claar et al. | 711/165 |
| 6,571,261 B1 * | 5/2003 | Wang-Knop et al. | 707/206 |
| 6,779,081 B2 * | 8/2004 | Arakawa et al. | 711/112 |
| 2007/0168633 A1 * | 7/2007 | English et al. | 711/165 |

FOREIGN PATENT DOCUMENTS

| | | |
|---|---|---|
| TW | 425504 | 3/2001 |
| TW | I227829 | 2/2005 |
| WO | WO 2004066153 | 8/2004 |

* cited by examiner

*Primary Examiner*—Hiep T Nguyen (57) ABSTRACT

Methods and systems for storage space management are provided. An embodiment of a method manages storage space comprising multiple blocks. Multiple discontinuous and unused regions are merged into a single and consecutive region for each block. For each block, the merged region does not contain the minimum and maximum addresses of the block.

18 Claims, 10 Drawing Sheets

STORAGE SPACE MANAGEMENT METHODS AND SYSTEMS

BACKGROUND

The present invention relates to storage space management, and more particularly, to storage space defragmentation methods and systems.

A memory device typically contains many small, discontinuous and unused storage areas exists in a storage space after numerous writing, modifying and removing operations. This phenomenon, referred to as fragmentation, inevitably degrades the utilization of data storage and the performance of data recording or file manipulation.

SUMMARY

Methods for storage space management for storage space comprising multiple blocks are provided. Multiple discontinuous and unused regions are merged into a single and consecutive region for each block. For each block, the merged region does not contain the minimum and maximum addresses of the block.

The method may further comprise moving a record in one block to an unused region of another block, resulting in the block originally storing the moved record becoming a continuous and unused region.

The method may further comprise determining a defragmentation separator for each block, merging records located in a left area of the defragmentation separator to generate a consecutive left inner block (LIB) from the leftmost address for each block, and merging records located in a right area of the defragmentation separator to generate a consecutive right inner block (RIB) from the leftmost address for each block. As well as, when a record located in an address range containing the determined defragmentation separator is detected, one of several strategies may be adopted to merge the detected record, as described in the following paragraph. The method may further comprise: determining one record from multiple records stored in one block; determining one block from multiple blocks excluding the block containing the determined record, length of an unused region of the determined block exceeding or equaling length of the determined record; and moving the determined record into the unused region of the determined block. The moving step may further move the determined record adjacent to the original LIB of the determined block to form a new LIB, or move the determined record into the original RIB of the determined block to form a new RIB. The determined record may be a record nearest the defragmentation separator.

The method may further comprise sorting the blocks according to lengths of the unused regions in descending order, and performing block movements contingent upon the sorting results.

A machine-readable storage medium storing a computer program which, when executed by a processing unit, performs the method of storage space management is also disclosed.

Systems of storage space management are provided. An embodiment of a system of storage space management comprises a storage space and a processing unit. The storage space comprises multiple blocks. The processing unit, coupling to the storage space, merges multiple discontinuous and unused regions into a single and consecutive region for each block. For each block, the merged region does not contain the minimum and maximum addresses of the block.

The processing unit may further move a record in one block to an unused region of another block, resulting in the block originally storing the moved record becomes a continuous and unused region.

The processing unit may further determine a defragmentation separator for each block, merge records located in a left area of the defragmentation separator to generate a consecutive LIB from the leftmost address for each block, and merge records located in a right area of the defragmentation separator to generate a consecutive RIB from the leftmost address for each block. The processing unit may further, when a record located in an address range containing the determined defragmentation separator is detected, adopt one of multiple strategies to merge the detected record, as described in the following paragraph. The processing unit may further determine one record from multiple records stored in one block, determine one block from multiple blocks excluding the block containing the determined record, length of an unused region of the determined block exceeding or equaling length of the determined record, and move the determined record into the unused region of the determined block. The processing unit may further move the determined record adjacent to the original LIB of the determined block to form a new LIB, or move the determined record adjacent to the original RIB of the determined block to form a new RIB. The determined record may be a record nearest the defragmentation separator.

The processing unit may further sort the blocks according to lengths of the unused regions in descending order, and perform block movements contingent upon the sorting results.

The strategies for merging a record located in an address range containing the determined defragmentation separator are described in the following. In a strategy, the record is moved adjacent to the LIB of the same block. In a strategy, if the length of the detected record located separator exceeds the length of the detected record located in a right area of the defragmentation separator, the record is moved adjacent to the LIB of the same block, and otherwise, the record is moved adjacent to the RIB of the same block. In a strategy, if an unused region located in a left area of the defragmentation separator exceeds an unused region located in a right area of the defragmentation separator, the record is moved adjacent to the LIB of the same block, and otherwise, the record is moved adjacent to the RIB of the same block.

The defragmentation separator of i-th block may be represented as $s \times (i-1)+s/2$, an address range for a left area of the defragmentation separator may be represented as $[s \times (i-1), s \times (i-1)+\lfloor s/2 \rfloor]$, and an address range for a right area of the defragmentation separator may be represented as $[s \times (i-1)+\lfloor s/2 \rfloor, s \times i]$.

DESCRIPTION OF THE DRAWINGS

The invention will become more fully understood by referring to the following detailed description of embodiments with reference to the accompanying drawings, wherein.

DETAILED DESCRIPTION

Figure 1:
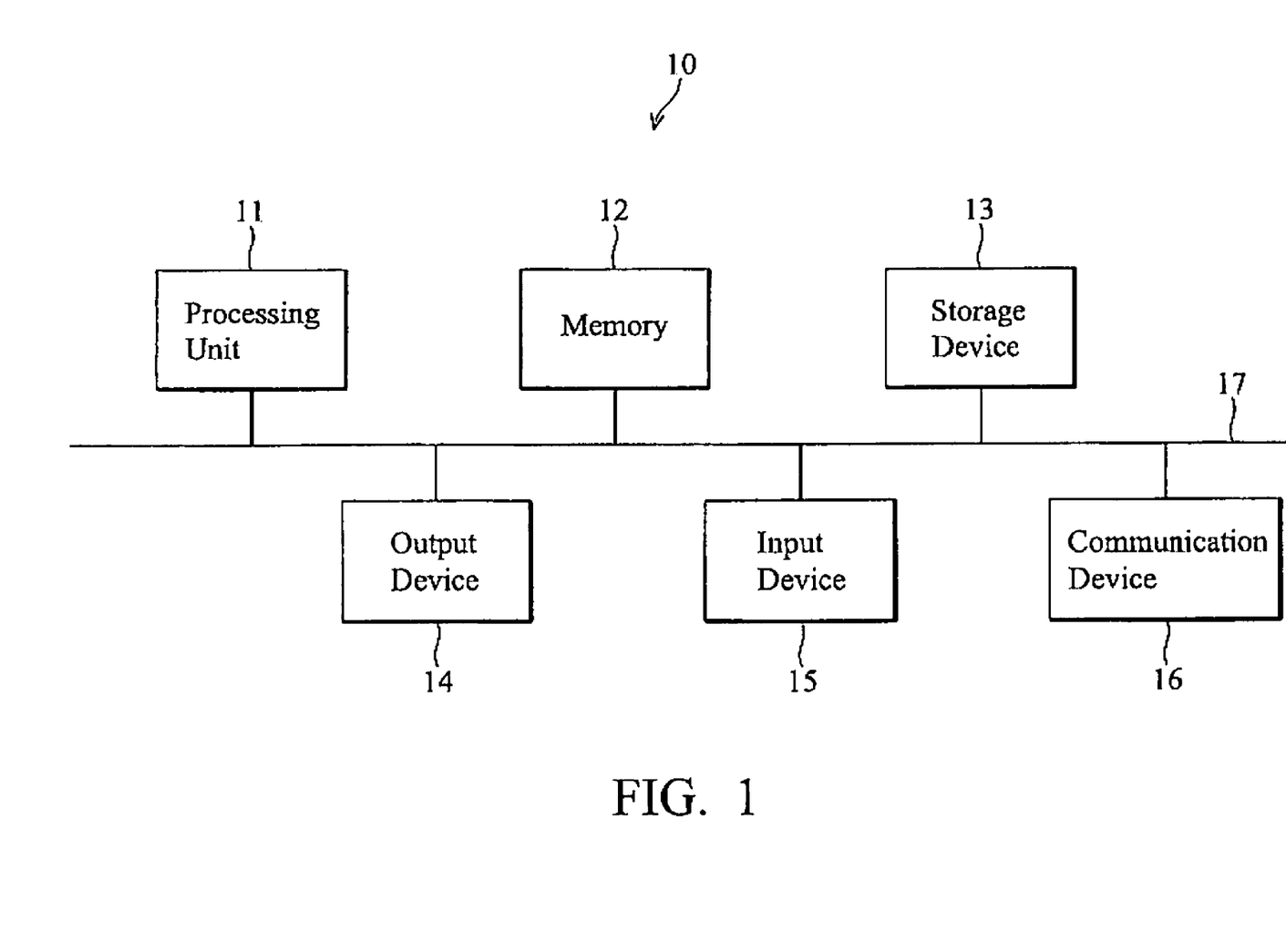
FIG. 1 is a diagram of a hardware environment applicable to an embodiment of a storage space management system.

FIG. 1 is a diagram of a hardware environment applicable to an embodiment of a storage space management system 10, comprising a processing unit 11, memory 12, a storage device 13, an output device 14, an input device 15 and a communication device 16. The processing unit 11 is connected by buses 17 to the memory 12, storage device 13, output device 14, input device 15 and communication device 16 based on Von Neumann architecture. There may be one or more processing units 11, such that the processor of the computer comprises a single central processing unit (CPU), a micro-processing unit (MPU) or multiple processing units, commonly referred to as a parallel processing environment. The memory 12 is preferably a random access memory (RAM), but may also include read-only memory (ROM) or flash ROM. The memory 12 preferably stores program modules executed by the processing unit 11 to perform storage space management. Generally, program modules include routines, programs, objects, components, or others, that perform particular tasks or implement particular abstract data types. Moreover, those skilled in the art will understand that some embodiments may be practiced with other computer system configurations, including handheld devices, multiprocessor-based, microprocessor-based or programmable consumer electronics, network PCs, minicomputers, mainframe computers, and the like. Some embodiments may also be practiced in distributed computing environments where tasks are performed by remote processing devices linked through a communication network. In a distributed computing environment, program modules may be located in both local and remote memory storage devices based on various remote access architecture such as DCOM, CORBA, Web objects, Web Services or other similar architectures. The storage device 13 may be a hard drive, magnetic drive, optical drive, portable drive, or nonvolatile memory drive. The drives and associated computer-readable media thereof (if required) provide nonvolatile storage of computer-readable instructions, data structures and program modules.

Figure 2:
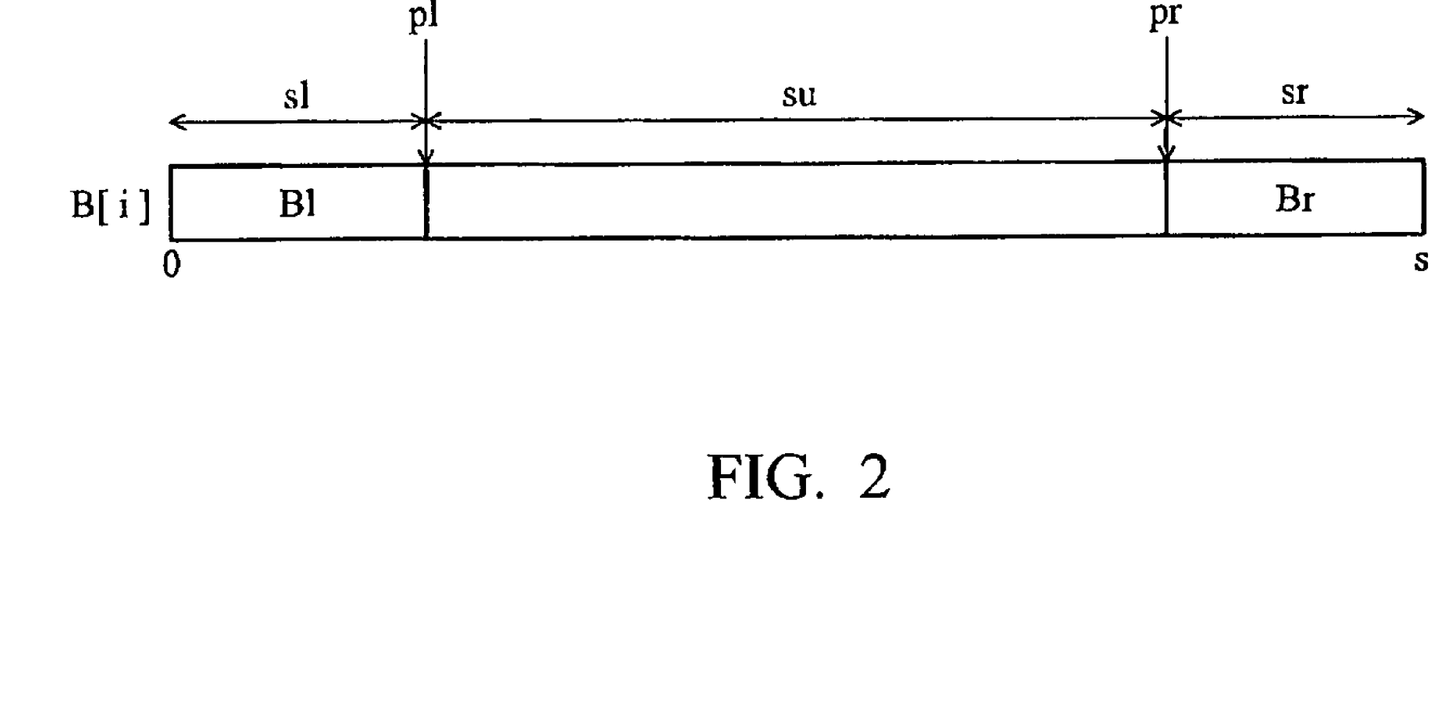
FIG. 2 is a diagram of an embodiment of a block.

Basically, each record is a collection of data values or items, the data types of which are the primitive data types defined for platform-specific APIs. For example, in the J2ME platform, a field of "int" requires four bytes, "long" eight bytes, "float" four bytes, "double" eight bytes, "String" two times of k bytes (e.g. a k-character string; each character of 16-bit Unicode code). The length of a record is variable. A bidirectional record file organization (BRFO) scheme containing numerous blocks in a storage region is provided. The storage region may be present in a volatile storage device such as a random access memory (RAM), buffer or similar, or a nonvolatile storage device such as a flash memory, hard disk, floppy disk, optical disk-RW or similar. A block is the basic unit of data transfer between physical data storage and memory. The block size is larger than the record size, and each block may contain numerous records. The records of a file are allocated to blocks in an unspanned fashion. When a record is larger than all of the unused storage fragments, another block is allocated for storage of this record. Hence, each block may include some unused storage segments, often referred to as internal fragmentation. FIG. 2 is a diagram of an embodiment of a block. A block consists of two inner blocks, a left block and a right block. To simplify the description, several notations are represented as follows. A block is denoted as B. Bl and Br respectively denote a left inner block (LIB) and a right inner block (RIB), pl being left offset of Bl, and pr being right offset of Br. When each block has a length of s consecutive bytes, and the lengths of Bl and Br are respectively denoted as sl and sr for $sl+sr \leqq s$, the unused region in a block is thus $su=s-(sl+sr)$. In addition, a storage region consisting of n blocks has a total consecutive storage allocation of n×s bytes. The numeral of every notation quoted by a square bracket indicates the block number at which it is located. For example, pr[7] means the right offset of the right inner block in the 7-th block.

Figure 3:
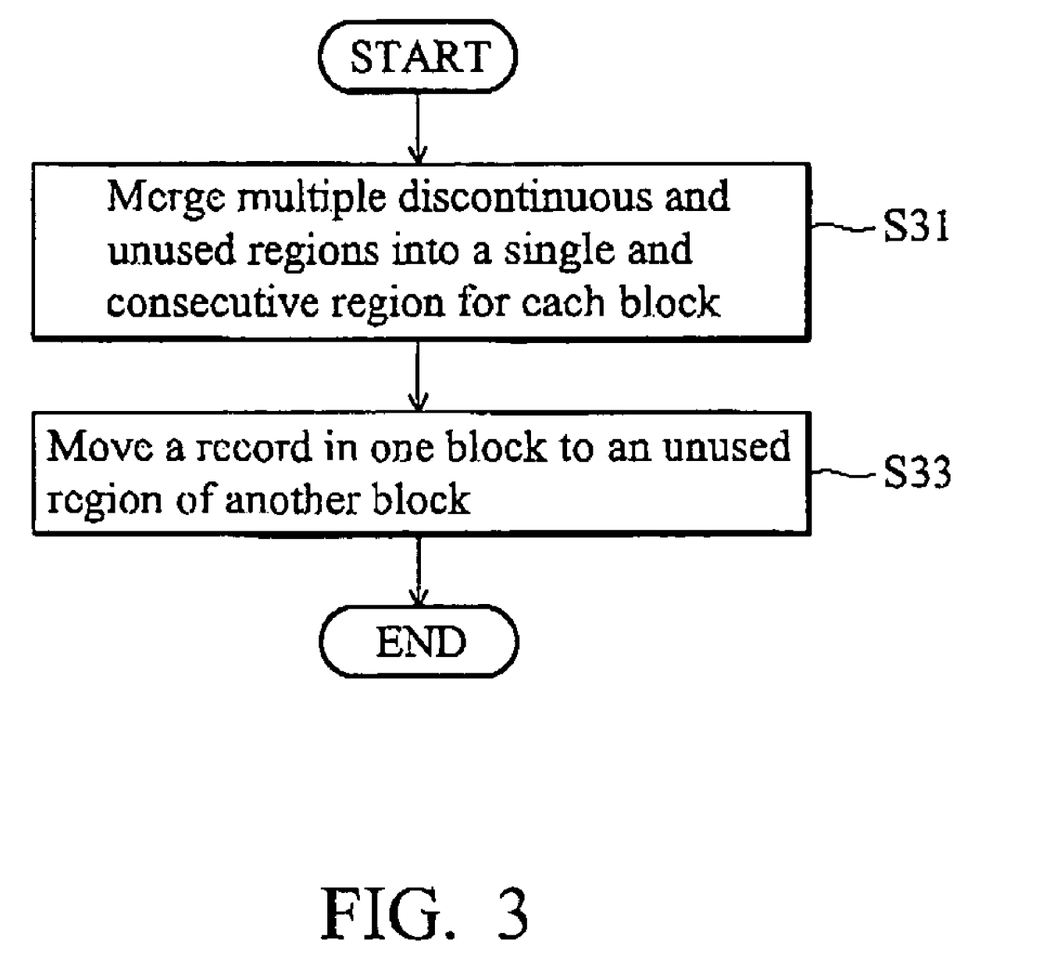
FIGS. 3 and 4A-4B are flowcharts of embodiments of defragmentation methods.

To reorganize the unused storage segments, aperiodic or periodic defragmentation process is provided. FIG. 3 is a flowchart of an embodiment of a defragmentation method, executed by the processing unit 11. In step S31, multiple discontinuous and unused regions are merged into a single and consecutive region for each block. Each single and consecutive region does not contain the minimum and maximum addresses of the blocks. In step S33, a record in one block is moved to an unused region of another block, resulting in the block originally storing the moved record becomes a continuous and unused region.

Figure 4A:
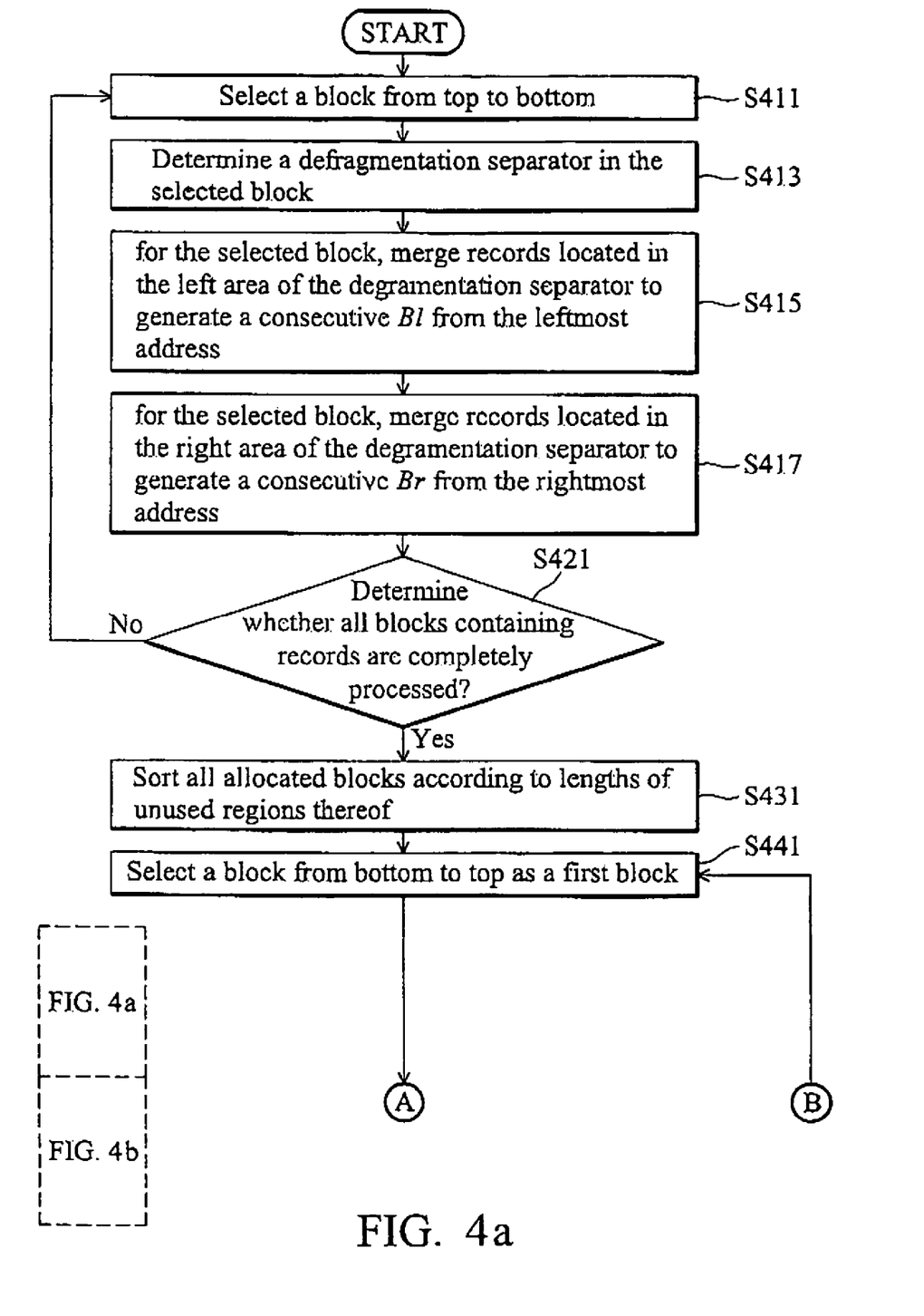
Figure 4B:
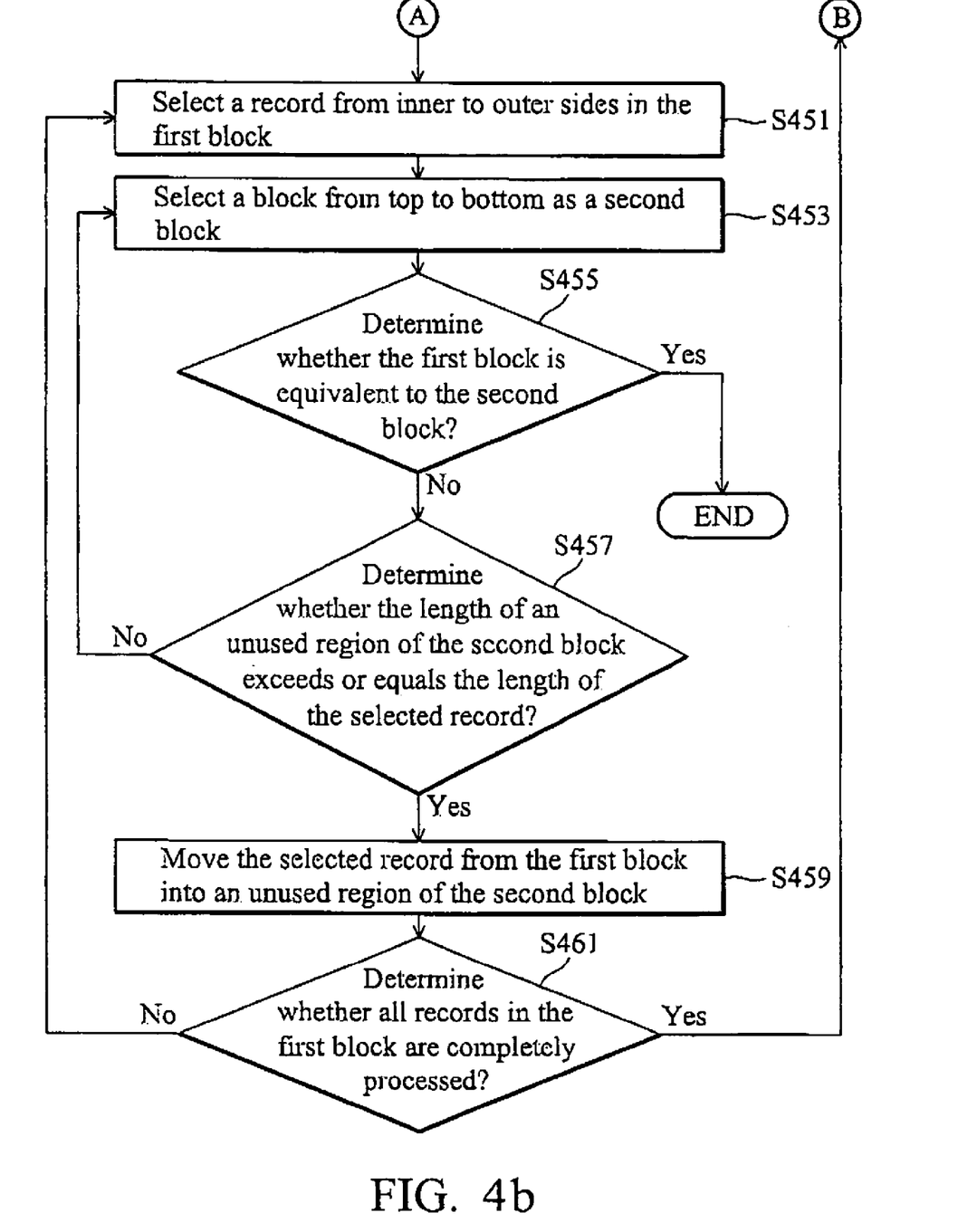

FIG. 4 is a flowchart of an embodiment of a defragmentation method, executed by the processing unit 11. In steps S411 to S421, an intra-block degragmentation procedure merges multiple discontinued and unused regions of each block into a single and consecutive region located in the center rather the left or right areas therein. In step S411, a block is selected from top to bottom (i.e. from low to high addresses). Those skilled in the art will recognize that a block may also be selected from high to low addresses. In step S413, a defragmentation separator in the selected block is determined. For an example of the i-th block, a defragmentation separator is located at offset $s \times (i-1)+s/2$, the address range for the left area of the defragmentation separator is $[s \times (i-1), s \times (i-1)+\lfloor s/2 \rfloor]$ and the address range for the right area of the defragmentation separator is $[s \times (i-1)+\lfloor s/2 \rfloor, s \times i]$. In step S415, for the selected block, records located in the left area of the defragmentation separator are merged to generate a consecutive Bl from the leftmost address (i.e. the lowest address). In step S417, for the selected block, records located in the right area of the defragmentation separator are merged to generate a consecutive Br from the rightmost address (i.e. the highest address). When a record located in an address range containing the determined defragmentation separator is detected, one of the strategies described in the following can be adopted to merge the detected record. In a strategy, the record is moved adjacent to the Bl of the selected block. In another strategy, it is determined whether the length of the record located in the left area of the defragmentation separator exceeds the length of the record located in the right area of the defragmentation separator, and, if so, the record is moved adjacent to the Bl, and otherwise, the record is moved adjacent to the Br. In still another strategy, it is determined whether the unused region located in the left area of the defragmentation separator exceeds the unused region located in the right area of the defragmentation separator, and, if so, the record is moved adjacent to the Bl, and otherwise, the record is moved adjacent to the Br. In step S421, it is determined whether all blocks containing records are completely processed, and, if so, the process proceeds to step S431, and otherwise, to step S411.

In step S431, all allocated blocks are sorted according to lengths of unused regions thereof, and subsequently, the sorting result is stored for subsequent process or the blocks are moved contingent upon the sorting result. Note that step S431 may be omitted to reduce process time.

In steps S441 to S461, an inter-block degragmentation procedure combines records in low utilization blocks into high utilization blocks to release more free blocks. In step S441, a block is selected from bottom to top (i.e. from high to low addresses) as a first block. Those skilled in the art will recognize that the block selection may be performed from low to high addresses. In step s451, a record is selected from inner to outer sides in the first block (i.e. from near to far against the defragmentation separator of the first block). In step S453, a block is selected from top to bottom (i.e. from low to high addresses) as a second block. Those skilled in the art will recognize that when step S441 selects blocks from low to high addresses, step S453 selects blocks from high to low addresses. In step S455, it is determined whether the first block is equivalent to the second block, and, if so, the process ends, and otherwise, the process proceeds to step S457. In step S457, it is determined whether the length of an unused region of the second block exceeds or equals the length of the selected record, and, if so, the process proceeds to step S459, and otherwise, to step S453. In step S459, the selected record is moved from the first block into an unused region of the second block. In step S461, it is determined whether all records in the first block are completely processed, and, if so, the process proceeds to step S441, and otherwise, to step S451.

Figure 5:
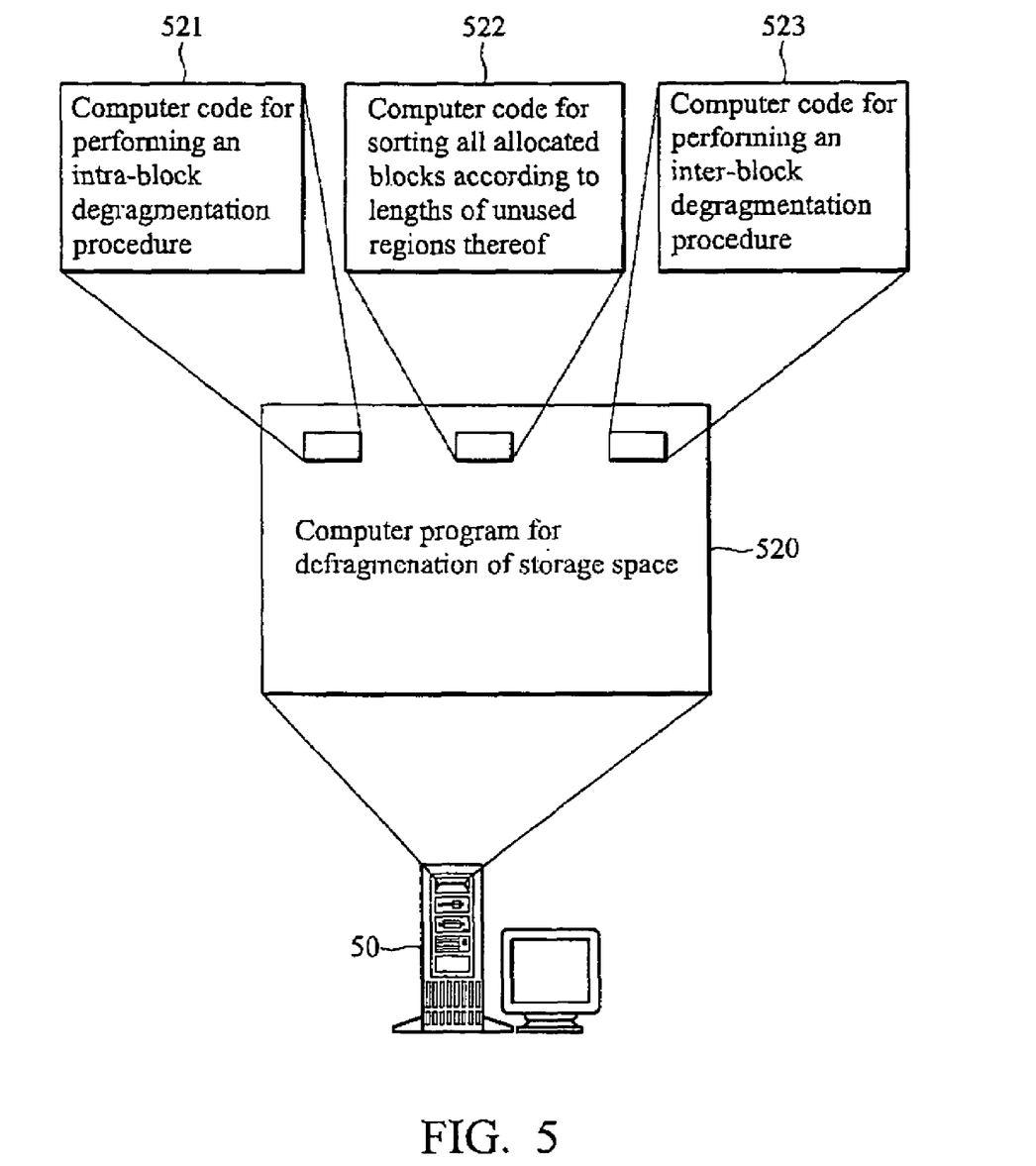
FIG. 5 is a diagram of a storage medium storing a computer program for storage space management.

Also disclosed is a storage medium as shown in FIG. 5 storing a computer program 520 providing the disclosed defragmentation methods. The computer program includes a storage medium 50 having computer readable program code therein for use in a computer system. The computer readable program code comprises at least computer readable program code 521 performing an intra-block degragmentation procedure, computer readable program code 522 sorting all allocated blocks according to lengths of unused regions thereof, and computer readable program code 523 performing an inter-block degragmentation procedure.

Systems and methods, or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer system, MS, PDA, MSC, SMSC and the like, the machine becomes an apparatus for practicing the invention. The disclosed methods and apparatuses may also be embodied in the form of program code transmitted over some transmission medium, such as electrical wiring or cabling, through fiber optics, or via any other form of transmission, wherein, when the program code is received and loaded into and executed by a machine, such as a computer or an optical storage device, the machine becomes an apparatus for practicing the invention. When implemented on a general-purpose processor, the program code combines with the processor to provide a unique apparatus that operates analogously to specific logic circuits.

Figure 6:
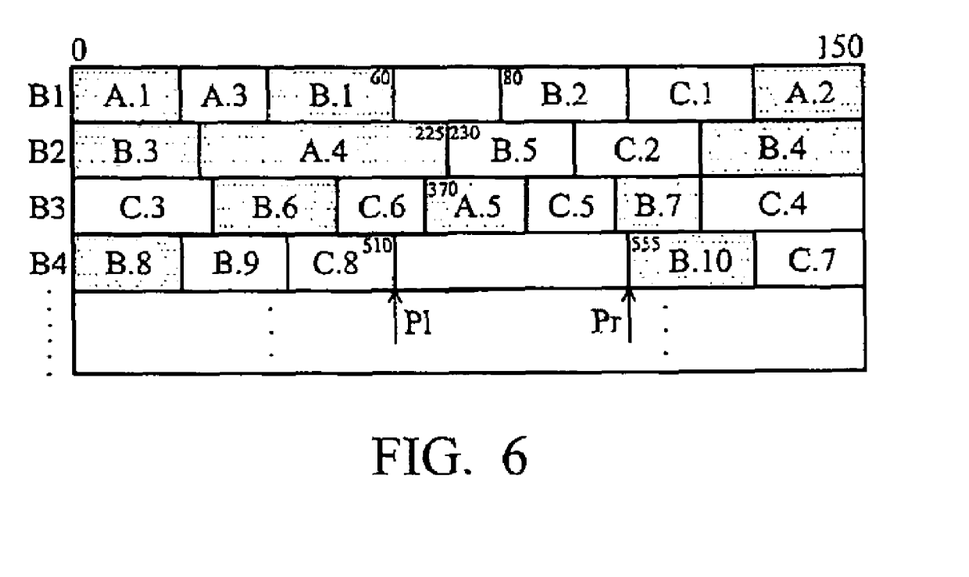
FIG. 6 is a schematic diagram showing initial storage space.
Figure 7:
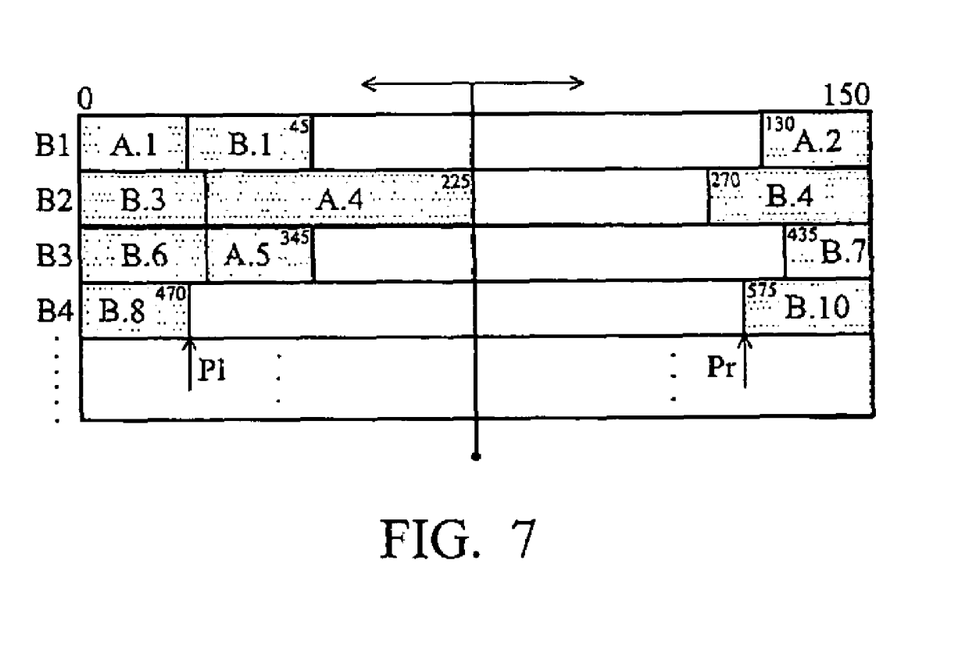
FIG. 7 is a schematic diagram of storage space without intra-block fragmentation.
Figure 8A:
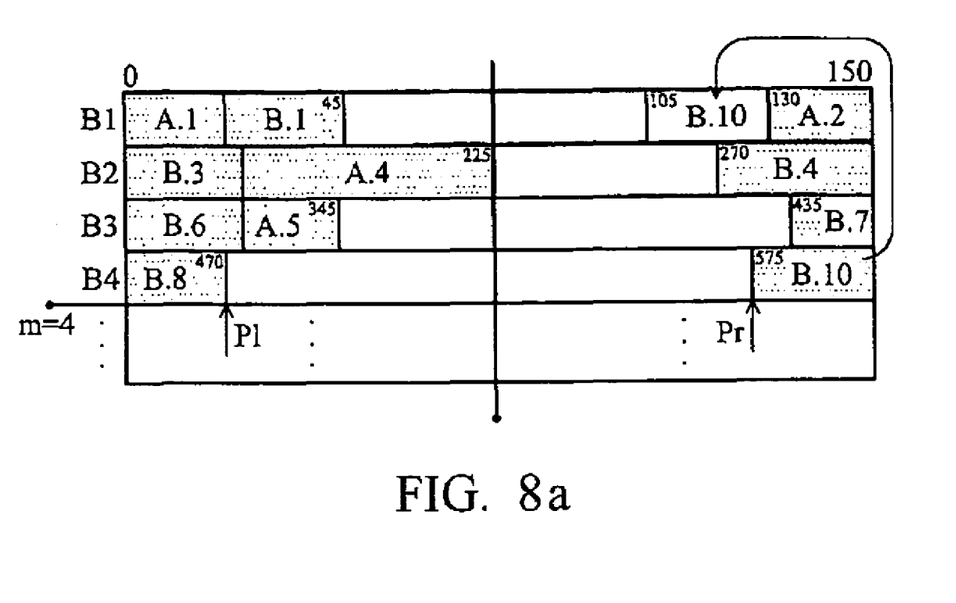
FIGS. 8a, 8b, 8c, 8d, 8e and 8f are schematic diagrams of storage space.
Figure 8B:
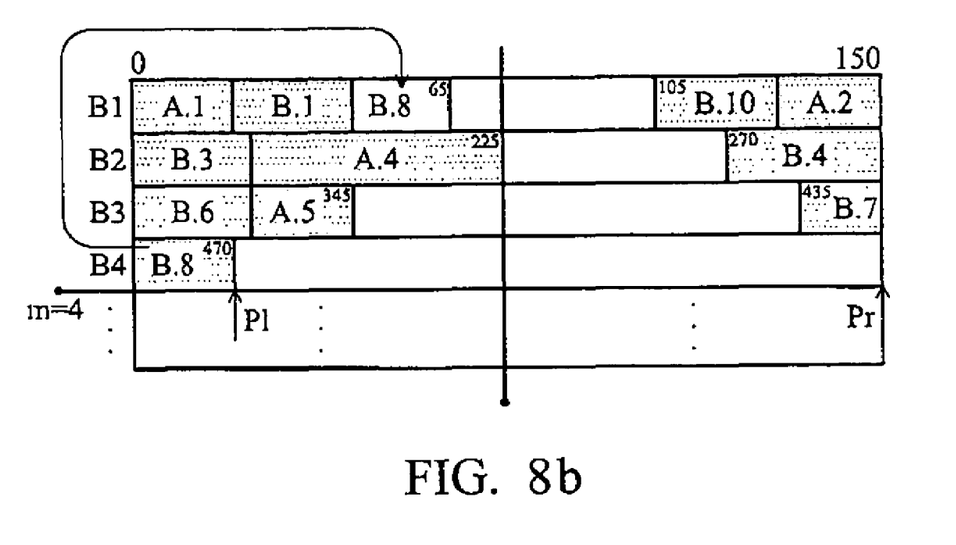
Figure 8C:
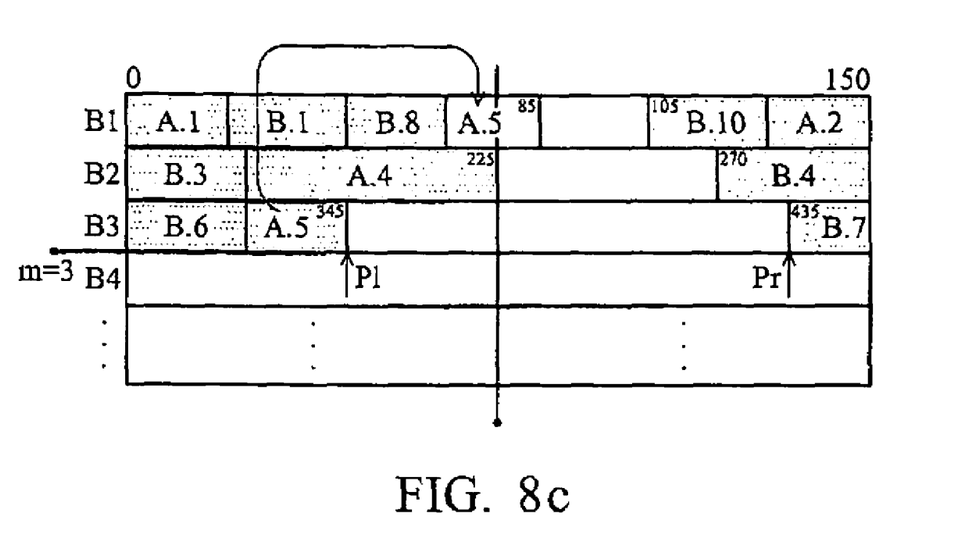
Figure 8D:
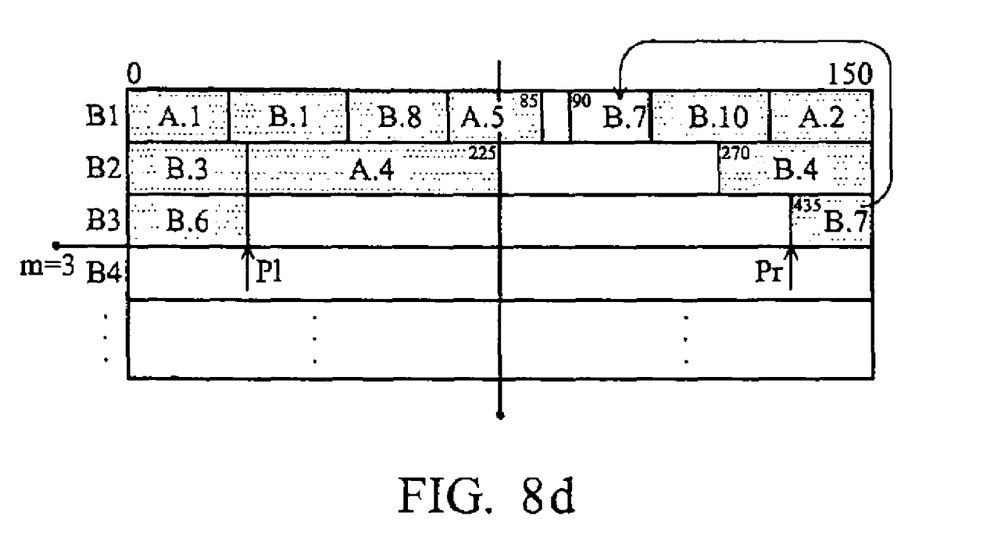
Figure 8E:
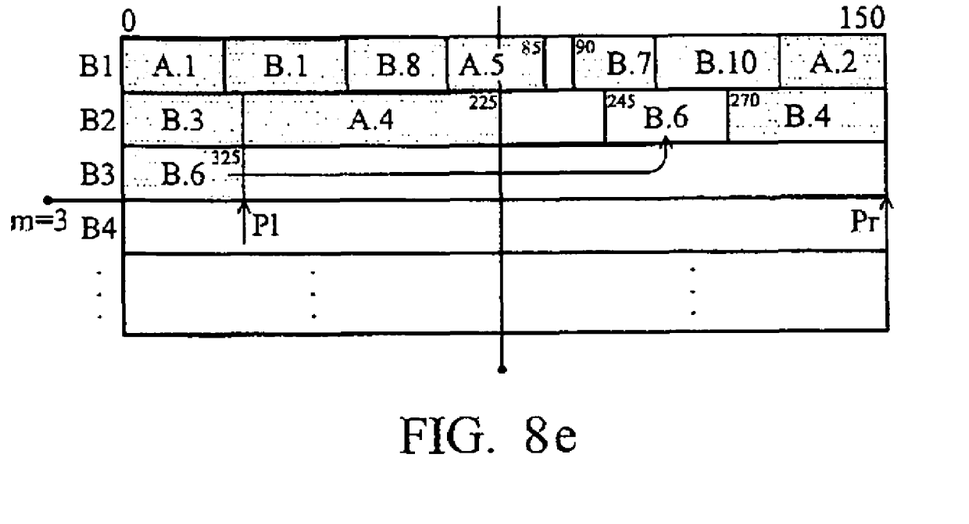
Figure 8F:
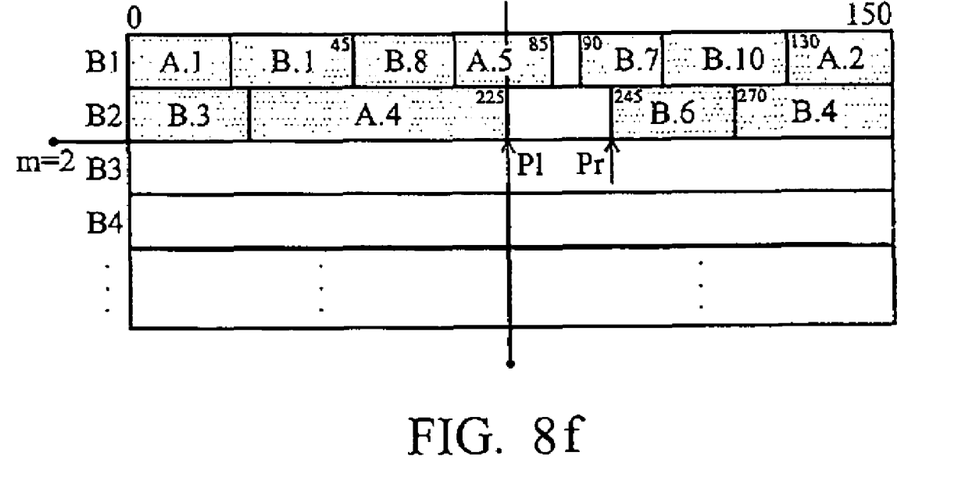

Details of the defragmentation method are illustrated in the following. FIG. 6 is a diagram showing initial storage space comprising four allocated blocks B1 to B4 respectively having 150 consecutive bytes. Initially, block B1 contains records A.1, B.1 and A.2, and unused regions which had stored records A.3, B.2 and C.1. Block B2 contains records B.3, A.4 and B.4, and unused regions which had stored records B.5 and C.2. Block B3 contains records B.6, A.5 and B.7, and unused regions which had stored records C.3, C.6, C.5 and C.4. Block B4 contains records B.8 and B.10, and unused regions which had stored records B.9, C.8 and C.7. Referring to FIG. 4, after performing an intra-block defragmentation procedure as shown in steps S411 to S421, the resulting storage space is shown in FIG. 7. FIG. 7 is a schematic diagram of storage space without intra-block fragmentation, where records in each block are clustered in both sides to generate larger and consecutively unused regions. In order to reduce process time, step S431 is omitted. And next, steps S451, S453, S455, S457 and S459 are sequentially performed to move record B.10 to an unused region of block B1, as shown in FIG. 8a. Steps S451, S453, S455, S457 and S459 are sequentially performed to move record B.8 to an unused region of block B1, as shown in FIG. 8b. Steps S451, S453, S455, S457 and S459 are sequentially performed to move record A.5 to an unused region of block B1, as shown in FIG. 8c. Steps S451, S453, S455, S457 and S459 are sequentially performed to move record B.7 to an unused region of block B1, as shown in FIG. 8d. Steps S451, S453, S455, S457 and S459 are sequentially performed to move record B.6 to an unused region of block B2, as shown in FIG. 8e. Finally, as there is no record to be moved, finally, the completely defragmentation result is shown in FIG. 8f.

While the invention has been described in terms of preferred embodiment, it is not intended to limit the invention to the precise embodiments disclosed herein. Those who are skilled in this technology can still make various alterations and modifications without departing from the scope and spirit of this invention. Therefore, the scope of the invention shall be defined and protected by the following claims and their equivalents.

What is claimed is:

1. A method of storage space management, managing a storage space, the storage space comprising a plurality of blocks, the method comprising:

merging a plurality of discontinuous and unused regions into a single and consecutive region for each block, wherein, for each block, the merged region does not contain a minimum and maximum addresses of the block;

determining a defragmentation separator for each block;

merging records located in a left area of the defragmentation separator to generate a consecutive left inner block (LIB) from the leftmost address for each block; and merging records located in a right area of the defragmentation separator to generate a consecutive right inner block (RIB) from the leftmost address for each block.

2. The method as claimed in claim 1 further comprising moving a record in a first block to an unused region of a second block, resulting in the first block originally storing the moved record becoming a continuous and unused region.

3. The method as claimed in claim 1 further comprising, when a record located in an address range containing the determined defragmentation separator is detected, adopting one of a plurality of strategies to merge the detected record, the strategies comprising:

moving the detected record adjacent to the LIB of the located block;

if the length of the detected record located in a left area of the defragmentation separator exceeds the length of the detected record located in a right area of the defragmentation separator, moving the detected record adjacent to the LIB of the located block, and otherwise, moving the detected record adjacent to the RIB of the located block; and if an unused region located in a left area of the defragmentation separator exceeds an unused region located in a right area of the defragmentation separator, moving the detected record adjacent to the LIB of the located block, and otherwise, moving the detected record adjacent to the RIB of the located block.

4. The method as claimed in claim 1 wherein the defragmentation separator of i-th block is represented as $s \times (i-1) + s/2$, an address range for a left area of the defragmentation separator is represented as $[s \times (i-1), s \times (i-1) + \lfloor s/2 \rfloor]$, and an address range for a right area of the defragmentation separator is represented as $[s \times (i-1) + \lfloor s/2 \rfloor, s/ \times i]$.

5. The method as claimed in claim 1 further comprising:
    determining one record from a plurality of records stored in one block;
    determining one block from a plurality of blocks excluding the block containing the determined record, wherein the length of an unused region of the determined block exceeds or equals the length of the determined record; and
    moving the determined record into the unused region of the determined block.

6. The method as claimed in claim 5 wherein the moving step further moves the determined record adjacent to the consecutive LIB of the determined block, or moves the determined record adjacent to the consecutive RIB of the determined block.

7. The method as claimed in claim 5 wherein the determined record is a record nearest the defragmentation separator.

8. The method as claimed in claim 1 further comprising:
    sorting the blocks according to the lengths of the unused regions in descending order; and
    performing block movements contingent upon the sorting results.

9. A machine-readable storage medium for storing a computer program executing by a processing unit, performing a method of storage space management, the processing unit managing a storage space comprising a plurality of blocks, the method comprising:
    merging a plurality of discontinuous and unused regions into a single and consecutive region for each block,
    wherein, for each block, the merged region does not contain a minimum and maximum addresses of the block,
    determining a defragmentation serarator for each block;
    merging records located in a left area of the defragmentation serarator to generate a consecutive left inner block (LIB) from the leftmost address for each block; and
    merging records located in a right area of the defragmentation serarator to generate a consecutive right inner block (RIB) from the leftmost address for each block.

10. A system of storage space management comprising:
    a storage space comprising a plurality of blocks; and
    a processing unit coupling to the storage space, merging a plurality of discontinuous and unused regions into a single and consecutive region for each block,
    wherein, for each block, the merged region does not contain a minimum and maximum addresses of the block,
    wherein the processing unit determines a defragmentation separator for each block, merges records located in a left area of the defragmentation separator to generate a consecutive left inner block (LIB) from the leftmost address for each block, and merges records located in a right area of the defragmentation separator to generate a consecutive right inner block (RIB) from the leftmost address for each block.

11. The system as claimed in claim 10 wherein the processing unit moves a record in a first block to an unused region of a second block, resulting in the first block originally storing the moved record becoming a continuous and unused region.

12. The system as claimed in claim 10 wherein the processing unit, when a record located in an address range containing the determined defragmentation separator is detected, adopts one of a plurality of strategies to merge the detected record, the strategies comprising:
    moving the detected record adjacent to the LIB of the located block;
    if the length of the detected record located in a left area of the defragmentation separator exceeds the length of the detected record located in a right area of the defragmentation separator, moving the detected record adjacent to the LIB of the located block, and otherwise, moving the detected record adjacent to the RIB of the located block; and
    if an unused region located in a left area of the defragmentation separator exceeds an unused region located in a right area of the defragmentation separator, moving the detected record adjacent to the LIB of the located block, and otherwise, moving the detected record adjacent to the RIB of the located block.

13. The system as claimed in claim 10 wherein the defragmentation separator of i-th block is represented as $s \times (i-1) + s/2$, an address range for a left area of the defragmentation separator is represented as $[s \times (i-1), s \times (i-1) + \lfloor s/2 \rfloor]$, and an address range for a right area of the defragmentation separator is represented as $[s \times (i-1) + \lfloor s/2 \rfloor, s \times i]$.

14. The system as claimed in claim 10 wherein the processing unit determines one record from a plurality of records stored in one block, determines one block from a plurality of blocks excluding the block containing the determined record, length of an unused region of the determined block exceeding or equaling length of the determined record, and moves the determined record into the unused region of the determined block.

15. The system as claimed in claim 14 wherein the processing unit moves the determined record adjacent to the consecutive LIB of the determined block, or moves the determined record adjacent to the consecutive RIB of the determined block.

16. The system as claimed in claim 14 wherein the determined record is a record nearest the defragmentation separator.

17. The system as claimed in claim 10 wherein the processing unit sorts the blocks according to the lengths of the unused regions in descending order and performs block movements contingent upon the sorting results.

18. The system as claimed in claim 10 wherein the storage space is stored in a volatile storage device or a non-volatile storage device.

* * * * *